US012288052B2

(12) United States Patent
Luo

(10) Patent No.: US 12,288,052 B2
(45) Date of Patent: Apr. 29, 2025

(54) METHOD FOR CREATING PRIVATE IMAGE IN PUBLIC CLOUD AND RELATED DEVICE

(71) Applicant: Huawei Cloud Computing Technologies Co., Ltd., Guizhou (CN)

(72) Inventor: Sibiao Luo, Beijing (CN)

(73) Assignee: HUAWEI CLOUD COMPUTING TECHNOLOGIES CO., LTD., Guizhou (CN)

(*) Notice: Subject to any disclaimer, the term of this patent is extended or adjusted under 35 U.S.C. 154(b) by 192 days.

(21) Appl. No.: 18/140,759

(22) Filed: Apr. 28, 2023

(65) Prior Publication Data

US 2023/0266958 A1    Aug. 24, 2023

Related U.S. Application Data

(63) Continuation of application No. PCT/CN2021/127688, filed on Oct. 29, 2021.

(30) Foreign Application Priority Data

Oct. 30, 2020    (CN) .......................... 202011195100.6

(51) Int. Cl.
G06F 8/61    (2018.01)
G06F 9/4401    (2018.01)
G06F 9/445    (2018.01)

(52) U.S. Cl.
CPC .............. G06F 8/63 (2013.01); G06F 9/4401 (2013.01); G06F 9/44505 (2013.01)

(58) Field of Classification Search
None
See application file for complete search history.

(56) References Cited

U.S. PATENT DOCUMENTS 11,057,471 B2 * 7/2021 Guo .................. H04L 67/10
11,088,903 B2 * 8/2021 Li ..................... H04L 63/0807
(Continued)

FOREIGN PATENT DOCUMENTS

CN    107733985 A    2/2018
CN    111045781 A    4/2020

OTHER PUBLICATIONS

Aryotejo et al., "Hybrid cloud: bridging of private and public cloud computing," IOP Publishing Ltd., 2018, 8pg. (Year: 2018).*

(Continued)

*Primary Examiner* — Ryan D. Coyer

(74) *Attorney, Agent, or Firm* — WOMBLE BOND DICKINSON (US) LLP

(57) ABSTRACT

A method for creating a private image in a public cloud and a related device. The method includes: A cloud management platform on a network side provide a plurality of interfaces for a tenant, and obtain, based on the plurality of interfaces, an ISO file uploaded by the tenant and an operation input by the tenant. The cloud management platform registers the ISO file as an ISO image in the public cloud based on the input operation, where the ISO image carries the installation file of the operating system, installs the installation file of the operating system carried in the ISO image on a temporary cloud server, sets a running environment in an operating system on the temporary cloud server, obtains an image of the temporary cloud server in which the running environment is set, and records the image as a system disk image of the tenant in the public cloud.

18 Claims, 5 Drawing Sheets

(56) References Cited

U.S. PATENT DOCUMENTS

| | | | |
|---|---|---|---|
| 11,210,139 B2* | 12/2021 | Srinivasa | H04L 41/042 |
| 11,216,265 B1* | 1/2022 | Hornbeck | G06F 9/5072 |
| 2020/0409921 A1* | 12/2020 | Starks | G06F 9/44557 |
| 2022/0353341 A1* | 11/2022 | Östrand | H04L 67/51 |

OTHER PUBLICATIONS

Raja et al., "An Enhanced Study on Cloud Data Services using Security Technologies," IEEE, 2017, 5pg. (Year: 2017).*
Vikas et al., "Private Vs Public Cloud," ResearchGate, 2013, 6pg. (Year: 2013).*
Zhang et al., "Protecting Private Cloud Located within Public Cloud," IEEE, 2013, 5pg. (Year: 2013).*

* cited by examiner

| Architecture type | X86 | ARM |
| --- | --- | --- |
| Manner of booting | BIOS | UEFI |
| Operating system | Please input an operating system | Please input an operating system version |
| System disk (GB) | 40-1024 | |
| Name | | |

FIG. 3

| Available area | Available area 3 | Available area 2 | Available area 1 |
| --- | --- | --- | --- |
| Specification | | | |
| System disk (GB) | High IO 50 GB | | |
| Data disk (GB) | One\|high IO 50 GB | | |
| Cloud server name | | | |
| Project name | | | |
| Configuration costs | ¥ 1,000 | | |

FIG. 4

METHOD FOR CREATING PRIVATE IMAGE IN PUBLIC CLOUD AND RELATED DEVICE

CROSS-REFERENCE TO RELATED APPLICATIONS

This application is a continuation of International Application No. PCT/CN2021/127688, filed on Oct. 29, 2021, which claims priority to Chinese Patent Application No. 202011195100.6, filed on Oct. 30, 2020. The disclosures of the aforementioned applications are hereby incorporated by reference in their entireties.

TECHNICAL FIELD

Embodiments of this application relate to the field of cloud computing technologies, and in particular, to a method and an apparatus for creating a private image in a public cloud, a computing device, and a computer-readable storage medium.

BACKGROUND

Mirroring is an elastic cloud server template, and includes at least an operating system. During actual application, mirroring may further include application software (such as database software) and private software. Images may be classified into public images and private images. A public image is a common standard image of an operating system and is visible to all tenants. The public image may include the operating system and a pre-installed public application. A private image is an image created by a tenant and is visible only to the tenant. The private image may include an operating system and a pre-installed public application, and may further include a private application of the tenant.

At present, when a private image is created, an existing local image is usually registered as the private image by using a private image import function, but a private ISO image cannot be registered. A tenant cannot create a private image on a cloud management platform by using an isolation (ISO) file.

SUMMARY

Embodiments of this application provide a method and an apparatus for creating a private image in a public cloud, a computing device, and a computer-readable storage medium. An operating system and a related driver that are included in an ISO file are installed into a temporary cloud server, so that a tenant can create a private image on a cloud management platform on a network side by using the ISO file.

According to a first aspect, this application provides a method for creating a private image in a public cloud, and the method is used for a cloud management platform on a network side. In a process of creating a private image, the cloud management platform may provide an ISO file uploading interface. The ISO file uploading interface may help a tenant upload an ISO file, so that the cloud management platform may obtain, through the ISO file uploading interface, the ISO file uploaded by the tenant, where the ISO file carries an installation file of an operating system. In addition, the cloud management platform further provides an ISO image registration interface, a cloud server installation interface, a cloud server setting interface, and a cloud server image obtaining interface. The ISO image registration interface is configured to receive a first operation input by the tenant, the cloud management platform may register the ISO file as an ISO image in the public cloud based on the first operation, and the ISO image carries the installation file of the operating system and registration information. The cloud server installation interface is configured to receive a second operation input by the tenant, and the cloud management platform may install, based on the second operation by using the installation file, the operating system carried in the ISO image on a temporary cloud server. The cloud server setting interface is configured to receive a third operation input by the tenant, and the cloud management platform sets a running environment in an operating system of the temporary server based on the third operation. The cloud server image obtaining interface is configured to receive a fourth operation input by the tenant, obtain, based on the fourth operation, an image of the temporary cloud server in which the running environment is set, and record the image as a system disk image of the tenant in the public cloud, where the system disk image is provided for the tenant to create, in the public cloud, a cloud server in which the operating system and the running environment are set.

The cloud management platform may create, based on the series of operations input by the tenant and the ISO file uploaded by the tenant, the system disk image required by the tenant, that is, a private image required by the tenant, to improve use experience of the tenant and meet an actual application requirement of the tenant.

In an embodiment, the cloud management platform may further provide a cloud server deletion interface. The cloud server deletion interface may be configured to receive a fifth operation input by the tenant, and the cloud management platform may delete, based on the fifth operation, the temporary cloud server after creating a private image. In this way, a resource occupied by the temporary cloud server can be released, to avoid occupation and waste of an unnecessary cloud server resource.

In an embodiment, the cloud server installation interface provided by the cloud management platform may be further configured to receive a sixth operation input by the tenant. In addition, when installing the operating system, the cloud management platform may install the operating system for the temporary cloud server based on the sixth operation. In this way, the tenant can customize installation of the operating system.

For example, in a process in which the cloud management platform installs the operating system for the temporary cloud server, the tenant may specify content such as an installation path, a disk partition, and a driver entry of the operating system through the cloud server installation interface, and the cloud management platform may perform a corresponding operating system installation process based on a customized installation operation (that is, the sixth operation) of the tenant.

In an embodiment, the cloud management platform may automatically perform an installation process of an operating system and a corresponding driver based on an automatic answer file integrated into the ISO file, so that the tenant may not need to engage in the installation process. The cloud management platform may obtain an automatic answer file in the installation file of the operating system, and automatically install the operating system and a driver on the temporary cloud server based on the automatic answer file. The automatic answer file may be, for example, an unattend.xml file, and may define content such as an installation path, a partition status, and a driver entry of an operating system.

In an embodiment, the temporary cloud server may include at least two volumes: a first volume and a second volume respectively. The first volume may include the operating system and the driver. When installing the operating system and the driver on the temporary cloud server, the cloud management platform may start the installation from the first volume, install the operating system and the driver that are in the first volume into the second volume, and set a manner of booting an operating system in the second volume to booting from a hard drive.

In an embodiment, the system disk image created by the cloud management platform may be a system disk image that is based on a Windows operating system or a Linux operating system. When creating the system disk image of the Windows operating system, the cloud management platform may first obtain, through the ISO file uploading interface, an original installation file uploaded by the tenant. The original installation file includes the Windows operating system. Usually, the original installation file may not include a driver required for installing the operating system. Therefore, the cloud management platform may integrate, into the original installation file, the driver corresponding to the Windows operating system, and obtain an ISO file, so that the cloud management platform may create, based on the ISO file integrated with the driver, a private image that is based on the Windows operating system.

For example, the driver may be a Virtio driver.

When a private image of the Linux operating system is created, the ISO file uploaded by the tenant usually includes a Virtio driver. Therefore, the cloud management platform may not need to integrate the Virtio driver for the ISO file uploaded by the tenant.

According to a second aspect, an embodiment of this application further provides an apparatus for creating a private image in a public cloud. The apparatus is used for a cloud management platform on a network side, and the apparatus includes:

an obtaining module, configured to: provide an isolation ISO file uploading interface, and obtain, through the ISO file uploading interface, an ISO file uploaded by a tenant, where the ISO file carries an installation file of an operating system;

a registration module, configured to: provide an ISO image registration interface, where the ISO image registration interface is configured to receive a first operation input by the tenant, and register the ISO file as an ISO image in the public cloud based on the first operation, where the ISO image carries the installation file of the operating system and registration information;

an installation module, configured to: provide a cloud server installation interface, where the cloud server installation interface is configured to receive a second operation input by the tenant, and install, based on the second operation by using the installation file, the operating system carried in the ISO image on a temporary cloud server;

a setting module, configured to: provide a cloud server setting interface, where the cloud server setting interface is configured to receive a third operation input by the tenant, and set a running environment in an operating system on the temporary cloud server based on the third operation; and a recording module, configured to: provide a cloud server image obtaining interface, configured to receive a fourth operation input by the tenant, obtain, based on the fourth operation, an image of the temporary cloud server in which the running environment is set, and record the image as a system disk image of the tenant in the public cloud, where the system disk image is provided for the tenant to create, in the public cloud, a cloud server in which the operating system and the running environment are set.

Any one of the second aspect or the implementations of the second aspect is a method implementation corresponding to any one of the first aspect or the implementations of the first aspect. The descriptions in any one of the first aspect or the implementations of the first aspect are applicable to any one of the second aspect or the implementations of the second aspect. Details are not described herein. The apparatus for creating a private image in a public cloud provided in the second aspect has a function of implementing the implementations of the first aspect. The function may be implemented by hardware, or may be implemented by hardware executing corresponding software. The hardware or the software includes one or more modules corresponding to the function.

According to a third aspect, an embodiment of this application provides a computing device, including a processor and a memory. The memory is configured to store instructions. When the apparatus runs, the processor executes the instructions stored in the memory, so that the apparatus performs the method for creating a private image in a public cloud in the method in any one of the first aspect or the implementations of the first aspect. It should be noted that the memory may be integrated into the processor, or may be independent of the processor. The apparatus may further include a bus. The processor is connected to the memory by using the bus. The memory may include a readable memory and a random-access memory.

According to a fourth aspect, an embodiment of this application further provides a computer-readable storage medium. The readable storage medium stores a program or instructions, and when the program or the instructions are run on a computer, any method for creating a private image in a public cloud in the first aspect is performed.

According to a fifth aspect, an embodiment of this application further provides a computer program product including instructions. When the computer program product runs on a computer, the computer is enabled to perform any method for creating a private image in a public cloud in the first aspect.

In addition, for technical effects brought by any implementation of the second aspect to the fifth aspect, refer to the technical effects brought by different implementations of the first aspect. Details are not described herein again.

BRIEF DESCRIPTION OF DRAWINGS

To describe technical solutions of embodiments of this application more clearly, the following briefly describes the accompanying drawings for describing embodiments. It is clear that the accompanying drawings in the following descriptions show merely some embodiments of this application, and a person of ordinary skill in the art may further derive other drawings from these accompanying drawings.

FIG. 3 is a schematic diagram of a setting interface for an architecture type and a manner of booting provided by a cloud management platform 100 for a tenant according to an embodiment of this application;

FIG. 4 is a schematic diagram of a configuration interface provided by a cloud management platform 100 for a tenant according to an embodiment of this application;

DESCRIPTION OF EMBODIMENTS

Figure 1:
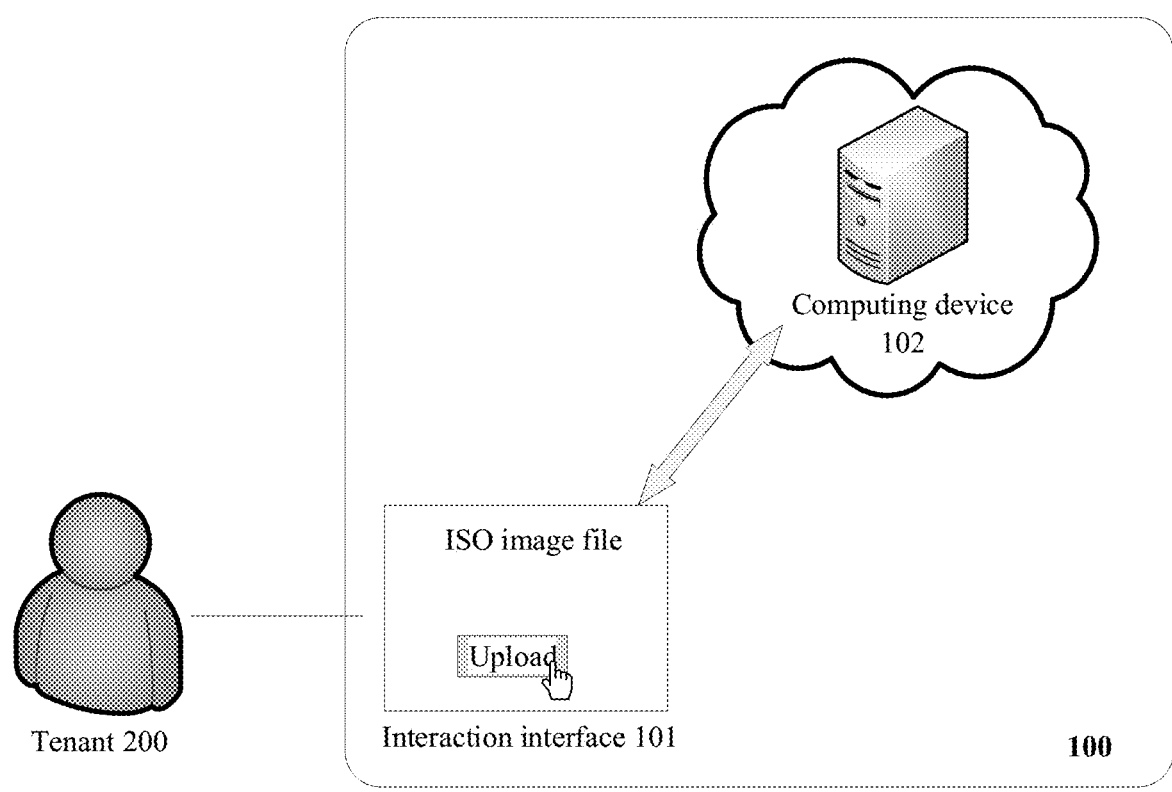
FIG. 1 is a schematic diagram of an example application scenario.

The following describes technical solutions in embodiments of the present invention with reference to the accompanying drawings. It is clear that the described embodiments are merely some but not all of embodiments.

The terms "first" and "second" are merely intended for description, and shall not be understood as an indication or implication of relative importance or an implicit indication of a quantity of indicated technical features. Therefore, a feature limited by "first" or "second" may explicitly or implicitly include one or more features. The terms "include", "have", and their variants all mean "include but are not limited to", unless otherwise emphasized in another manner.

At present, when creating a private image, a cloud management platform usually converts a local existing image into a private image required by a tenant. The local existing image may be registered as a private image by using a private image import function. However, the private image cannot be created for the tenant on the cloud management platform based on an ISO file provided by the tenant.

Therefore, an embodiment of this application provides a method for creating a private image in a public cloud. A cloud management platform on a network side may provide a plurality of interfaces for a tenant, including an ISO file uploading interface, an ISO image registration interface, a cloud server installation interface, a cloud server setting interface, and a cloud server image obtaining interface. The cloud management platform may obtain, through the ISO file uploading interface, an ISO file uploaded by the tenant, where the ISO file carries an installation file of an operating system. In addition, the cloud management platform may register the ISO file as an ISO image in the public cloud based on a first operation that is input by the tenant through the ISO image registration interface, where the ISO image carries the installation file of the operating system and registration information, then install, on a temporary cloud server based on a second operation that is input by the tenant through the cloud server installation interface, the installation file of the operating system carried in the ISO image, and set a running environment in an operating system on the temporary cloud server based on a third operation that is input by the tenant through the cloud server setting interface, so that the temporary cloud server in which the operating system is installed may be obtained. Therefore, the cloud management platform may obtain, based on a fourth operation that is input by the tenant through the cloud server image obtaining interface, an image of the temporary cloud server in which the running environment is set, and record the image as a system disk image of the tenant in the public cloud, where the system disk image is provided for the tenant to create, in the public cloud, a cloud server in which the operating system and the running environment are set. In this way, for different ISO files provided by different tenants, the cloud management platform may create a private image required by each tenant for the tenant, to improve use experience of the tenant and meet an actual application requirement of the tenant.

The system disk image may be used as a private image of the tenant in the public cloud. That is, the tenant may use the private image to quickly establish, in a virtual machine, a container, or a bare metal server purchased by the tenant, a cloud service or a cloud application in which the operating system and the running environment required by the tenant are set.

In an example, embodiments of this application may be used in an application scenario shown in FIG. 1. In this scenario, a cloud management platform 100 may provide an interaction interface 101, and a tenant 200 may upload an ISO file and input a related operation in the interaction interface 101. In this way, the cloud management platform 100 may install a cloud server based on an ISO image registered by the tenant 200, so that a private image expected by the tenant 200 may be further created based on the created cloud server. The cloud management platform 100 may be implemented by one or more computing devices 102 (where one computing device 102 is used as an example in FIG. 1). During actual application, the computing device 102 may be a server that provides a corresponding cloud service, or the like.

To make the objectives, features, and advantages of this application more apparent and understandable, the following describes various non-limiting implementations in embodiments of this application with reference to the accompanying drawings by using examples. Clearly, the described embodiments are some but not all of embodiments of this application. All other embodiments obtained by a person of ordinary skill in the art based on embodiments of this application without creative efforts shall fall within the protection scope of this application.

Figure 2:
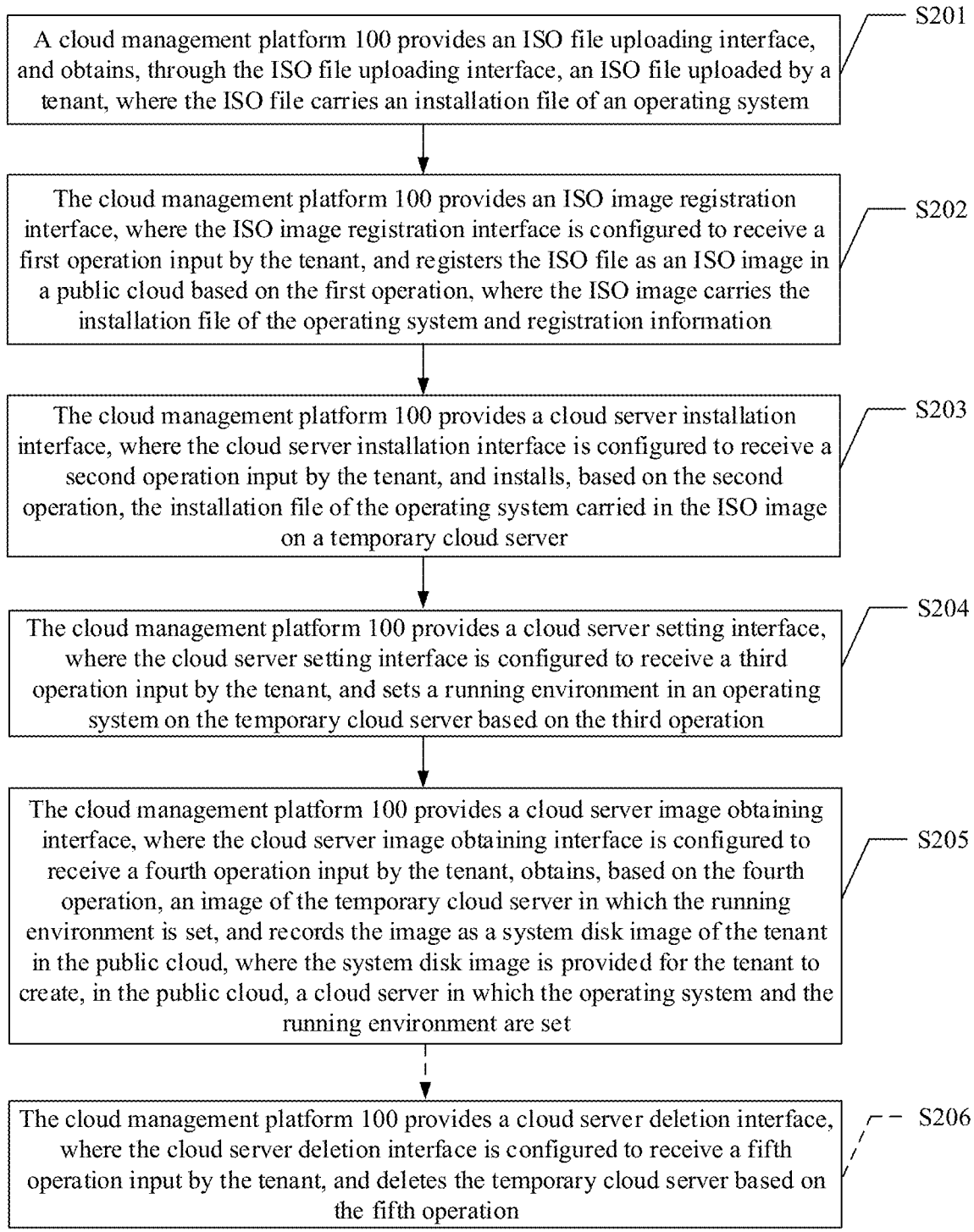
FIG. 2 is a schematic flowchart of a method for creating a private image according to an embodiment of this application.

FIG. 2 is a schematic flowchart of a method for creating a private image in a public cloud according to an embodiment of this application. The method may be used for the cloud management platform 100 shown in FIG. 1, and may be used for a device included in the cloud management platform 100 or a functional module on the device. That the cloud management platform 100 performs the creation is described below. The method may include the following operations.

Operation S201: The cloud management platform 100 provides an ISO file uploading interface, and obtains, through the ISO file uploading interface, an ISO file uploaded by a tenant, where the ISO file carries an installation file of an operating system.

An image file is a single file created, in a format, based on a series of files such as an operating system file, a bootstrap program file, and an operating system booting manner file. During actual application, the image file may have a plurality of different formats, for example, a format ".iso", a format ".ccd", a format ".bwt", and a format ".nrg". The ISO file in this embodiment refers to an image file that is based on the format ".iso".

In some possible implementations, the cloud management platform 100 may provide the interaction interface 101 shown in FIG. 1, and the interaction interface 101 may include an operation button for uploading the ISO file. The tenant may tap the corresponding operation button in the interaction interface 101, and upload the ISO file. The ISO file includes at least the installation file of the operating system corresponding to a to-be-created private image, for example, an installation file of a Windows operating system or a Linux operating system. Correspondingly, the cloud management platform 100 may provide an ISO file uploading interface corresponding to the operation button, and obtain, through the ISO file uploading interface, the ISO file uploaded by the tenant.

For example, the cloud management platform 100 may use the ISO file uploaded by the tenant as an object and upload the ISO file to an object-based storage service (OBS) bucket of the tenant. For example, the cloud management platform 100 may store the ISO file in the OBS bucket by using an OBS browser and a tool. Certainly, in this embodiment, implementations of uploading the ISO file and cloud storage of the ISO file on the cloud management platform 100 are not limited.

During actual application, the image file that is uploaded by the tenant and that is received by the cloud management platform 100 may alternatively be an image file in another format. Therefore, in some examples, the cloud management platform 100 may add an identifier indicating an image file type of the ISO file uploaded by the tenant, for example, "Type=IsoImage", to distinguish the ISO file from an image file in another format. It should be noted that the ISO file may be integrated with a driver corresponding to the operating system. When the tenant expects to create, on the cloud management platform 100, a private image based on the Windows operating system, because an original installation file (that may include only the operating system) corresponding to the Windows operating system may usually not include a driver required for installing the Windows operating system, such as a Virtio driver, when uploading an ISO file, the tenant may add the Virtio driver to the original installation file to obtain an ISO file, and then upload the ISO file integrated with the Virtio driver to the cloud management platform 100. For example, the ISO file is uploaded to the OBS bucket corresponding to the tenant. When the tenant creates a private image of the Linux operating system, an original installation file corresponding to the Linux operating system usually includes a Virtio driver. Therefore, the tenant may directly upload the original installation file (that is, an ISO file) corresponding to the Linux operating system to the cloud management platform 100.

In addition, the cloud management platform 100 may further provide a setting interface shown in FIG. 3 for the tenant. The setting interface may include a setting option for a system architecture of a temporary cloud server, for example, an "X86" architecture type and an "ARM" architecture type in FIG. 3. The tenant may select, in the setting interface, whether the temporary cloud server runs on an "X86" platform or runs on an "ARM" platform. For example, a gray area in FIG. 3 represents that an architecture type input (or selected) by the tenant is "X86". The cloud management platform 100 may set, based on an operation of the tenant selecting a running environment, the temporary cloud server to running in an "X86" architecture.

In a further possible implementation, the tenant may further select a manner of booting an operating system on the temporary cloud server. For example, the tenant may select, in the setting interface, whether the manner of booting the operating system on the temporary cloud server is booting to "BIOS" or booting to "UEFI" (for example, a gray area in FIG. 3 represents that a manner of booting input (or selected) by the tenant is "BIOS"). The "BIOS" refers to a basic input/output system (Basic Input/Output System), is a group of fixed programs in a device, and records a basic input/output program of the device, a self-test program after power-on, a system auto-booting program, and the like (where usually, the manner of booting, "BIOS", is not supported in an ARM architecture). The "UEFI" refers to a unified extensible firmware interface (Unified Extensible Firmware Interface). In the manner of booting, a self-test process during booting is skipped, and a booting speed is usually faster than that of the "BIOS".

During actual application, the tenant may further input more content into the setting interface, for example, may input a operating system in the ISO file, and provide a version of the operating system for the cloud management platform 100. In addition, the tenant may further input, in the input interface, a system disk size (that is allowed to range from 40 GB to 1024 GB) of the private image that is to be created, define a name of the private image, and the like. Certainly, the setting interface shown in FIG. 3 is merely used as an example for description. During actual application, the setting interface that is presented may be in another style, or the tenant may input more or less content in the setting interface. This is not limited in this embodiment.

Operation S202: The cloud management platform 100 provides an ISO image registration interface, where the ISO image registration interface is configured to receive a first operation input by the tenant, and registers the ISO file as an ISO image in the public cloud based on the first operation, where the ISO image carries the installation file of the operating system and registration information.

During actual application, the cloud management platform 100 may register, by using an image management service (IMS), the ISO file uploaded by the tenant as the ISO image. Different from another image, in this embodiment, the currently registered ISO image is not installed with an operating system, but carries an installation file of the operating system. Therefore, the corresponding operating system may be subsequently installed for the registered ISO image. In addition, the ISO image may further have the corresponding registration information. For example, the registration information may be metadata generated when the cloud management platform 100 performs ISO image registration, for example, may be metadata such as a storage path of the ISO file. The cloud management platform 100 records the metadata.

The cloud management platform may provide the ISO image registration interface for the tenant. The tenant may input, into the cloud management platform 100 through the ISO image registration interface, the first operation for implementing ISO image registration, where the first operation may be, for example, an operation (for example, a tap) that triggers the cloud management platform 100 to generate a registration instruction. Correspondingly, the cloud management platform 100 may register the ISO file as the ISO image in the public cloud based on the first operation.

In an ISO image registration process, the cloud management platform 100 may create a cloud server instance (elastic compute service instance) based on the ISO file, and invoke a Nova component on the cloud management platform 100 to assemble a computing storage resource for the cloud server instance, to implement a temporary cloud server. In this case, an operating system and a related driver are not installed on the created temporary cloud server. The Nova component is used to manage a life cycle of a cloud instance and support resources required for all activities in the life cycle.

In addition, the cloud management platform 100 further includes a Cinder component that provides a block storage service for the cloud management platform 100. The Cinder component may provide a virtual disk (which may also be referred to as a volume) for a cloud server. When creating the temporary cloud server, the Nova component may invoke the Cinder component to create at least two volumes for the temporary cloud server. In this embodiment, an example in which a first volume and a second volume are created is used.

The Cinder component may access a database in Glance through a Cinder driver, find metadata such as a download path of the ISO file in the OBS bucket from the database based on an identifier of the ISO file, and download the ISO file from the OBS bucket based on the obtained metadata. In an example, the download path of the ISO file in the OBS bucket may record information such as an IP address, an access port of the OBS bucket, an identifier of the OBS bucket (such as a name of the OBS bucket), and a stored object identifier. Therefore, the Cinder component determines the IP address of the OBS bucket based on the download path, accesses a OBS bucket (determined based on the OBS bucket) through a corresponding OBS port, and accesses an object corresponding to the object identifier in the OBS bucket, to obtain the ISO file.

Then, the Cinder driver may read the ISO file based on the obtained metadata, and write the ISO file (or the operating system and the driver in the ISO file) into the first volume. In this case, the first volume carries the installation file (including the driver) of the operating system, and the second volume is a blank volume with no written data temporarily.

In a further possible implementation, in the ISO image registration process, the cloud management platform 100 may further configure information such as an available area of the temporary cloud server, a specification, a cloud server name, a corresponding project name, a network interface card attribute, and a network rule file for clearing the temporary cloud server, so that an attribute of the temporary cloud server satisfies a requirement of the tenant. During actual application, the tenant may input, into the cloud management platform 100 through a cloud server configuration interface or another interface, an operation for configuring the temporary cloud server. For example, the cloud management platform 100 may present a configuration interface shown in FIG. 4 to the tenant, so that the tenant performs corresponding configuration in the configuration interface. Further, the configuration interface may further present other information of the temporary cloud server to the tenant, for example, disk space sizes of the created first volume (system disk) and the created second volume (data disk) and configuration costs of the temporary cloud server this time.

Operation S203: The cloud management platform 100 provides a cloud server installation interface, where the cloud server installation interface is configured to receive a second operation input by the tenant, and installs, based on the second operation by using the installation file, the operating system carried in the ISO image on a temporary cloud server.

The currently created temporary cloud server includes the ISO file, but installation of the operating system is not completed. As a result, the cloud management platform 100 may further install the operating system on the temporary cloud server. In this case, the cloud management platform 100 may provide the cloud server installation interface for the tenant, and the tenant inputs, into the cloud management platform 100 through the cloud server installation interface, the second operation used to install the operating system. The second operation may be, for example, an operation that triggers the cloud management platform 100 to install the operating system (for example, tapping a control for triggering the installation of the operating system).

Because the temporary cloud server usually does not include a CD-ROM driver, in a process of writing the ISO file to the first volume, a manner of booting the operating system in the ISO file written to the first volume may be set to "cdrom", to simulate booting the installation of the operating system from a cdrom driver. Correspondingly, a used disk interface type is "ide". In this way, the Cinder driver may boot the installation from the first volume, and install the operating system and the driver (such as the Virtio driver) that are in the first volume into the second volume. In an installation process, a manner of booting the operating system in the second volume may be changed to "disk", that is, a manner of booting the operating system that has been installed into the second volume is set to booting from a hard drive. Correspondingly, a disk interface type corresponding to the second volume may also be changed to "virtio". In this way, the operating system and the driver can be installed on the temporary cloud server.

During actual application, to enable the Cinder component to first boot from the first volume, the Cinder component may specify a volume booting sequence when creating the first volume and the second volume. For example, the volume created by the Cinder component may include an identifier of a booting sequence, for example, boot_index. In this case, the Cinder component may boot from the first volume based on the identifier of the booting sequence, to install the operating system and the driver that are in the first volume into the second volume. For example, the Cinder component may assign a value 0 to the identifier boot_index of the booting sequence of the first volume, and assign a value 1 to the identifier boot_index of the booting sequence of the second volume. Correspondingly, the Cinder component may preferentially boot from a volume with boot_index=0 by default. Certainly, a implementation of preferentially booting from the first volume is not limited in this embodiment.

It should be noted that, in the foregoing implementation, the Cinder component creates the first volume and the second volume at the same time. During actual application, the Cinder component may alternatively first create the first volume, and then create the second volume after successfully downloading the ISO file from the OBS bucket. This is not limited in this embodiment.

When the operating system and the driver are installed, the cloud management platform 100 may allow the tenant to engage in the installation process, for example, to specify an installation path of the operating system, or the cloud management platform 100 may perform automatic installation based on the second operation.

In an implementation in which the tenant engages in the installation of the operating system and the driver, the tenant may further input a sixth operation through the cloud server installation interface, and the cloud management platform 100 may determine, based on the sixth operation, how to install the operating system and the corresponding driver. For example, the cloud management platform 100 may provide an installation definition interface for the tenant. The tenant may remotely define the installation of the operating system in the installation definition interface, for example, define an installation path, a disk partition, and a disk name of the operating system on the temporary cloud server. In this case, the sixth operation may be an operation of the tenant selecting or inputting the disk partition, the installation path, and an entry of a to-be-installed driver of the operating system. In this way, the cloud management platform 100 may obtain an installation definition operation of the tenant on the operating system, and install the corresponding operating system for the temporary cloud server based on the installation definition operation.

In the foregoing implementation, the tenant engages in the installation of the operating system and the driver. Therefore, the cloud management platform 100 needs to determine, based on the sixth operation input by the tenant, installation information of the operating system and the driver, such as the disk partition, the installation path, and the driver entry, so that the tenant needs to be attentive. Correspondingly, in another possible implementation, the cloud management platform may alternatively automatically install the operating system and the driver.

An automatic answer file (such as an unattend.xml file) is integrated into the ISO file uploaded by the tenant. In this way, in a process of installing the operating system and the driver, the cloud management platform 100 may boot the automatic answer file, and automatically determine, based on the automatic answer file, information such as the installation path, the partition status, and a specific to-be-installed driver of the operating system, so that the process of installing the operating system and the driver does not need engagement of the tenant, to implement an unattended automatic installation process. For example, for the Windows system, the unattend.xml file may be integrated into the ISO file, and for Linux, a file such as AutoYaST or Kickstart may be integrated into the ISO file. Certainly, during actual application, the automatic installation of the operating system and the driver may alternatively be implemented in another manner. This is not limited in this embodiment.

Operation S204: The cloud management platform 100 provides a cloud server setting interface, where the cloud server setting interface is configured to receive a third operation input by the tenant, and sets a running environment in an operating system on the temporary cloud server based on the third operation.

During actual application, different cloud servers may be in different running environments. Therefore, the cloud management platform 100 may set a corresponding running environment for the created temporary cloud server, and the running environment may be set by the tenant. The cloud management platform 100 may provide the cloud server setting interface for the tenant. The tenant may input, into the cloud management platform 100 through the cloud server setting interface, the third operation used to set the running environment, so that the cloud management platform 100 may set the running environment for the temporary cloud server based on the third operation.

In some examples, the cloud management platform 100 may configure corresponding software in the operating system on the temporary cloud server, for example, office software, drawing software, or other software customized by the tenant, to complete configuration of the running environment in the operating system.

It should be noted that a execution sequence of operation S204 and operation S203 during actual application is not limited in this embodiment. In another embodiment, the running environment setting process in operation S204 may be performed first, and then the operating system installation process in operation S203 is performed. Alternatively, the cloud management platform may simultaneously perform operation S204 and operation S203.

Operation S205: The cloud management platform 100 provides a cloud server image obtaining interface, where the cloud server image obtaining interface is configured to receive a fourth operation input by the tenant, obtains, based on the fourth operation, an image of the temporary cloud server in which the running environment is set, and records the image as a system disk image of the tenant in the public cloud, where the system disk image is provided for the tenant to create, in the public cloud, a cloud server in which the operating system and the running environment are set.

The obtained system disk image may be used as a private image of the tenant in the public cloud, so that the user may use the private image to quickly establish, in the public cloud, a cloud service or a cloud application in which the operating system and the running environment required by the user are set.

After the temporary cloud server is installed and the running environment is set, the operating system and the driver in the temporary cloud server can meet an expectation of the tenant. In this case, the cloud management platform 100 may create, based on the temporary cloud server, a private image required by the tenant. The cloud management platform 100 may export an image file from the second volume of the temporary cloud server, to create, based on the image file exported from the second volume, the private image required by the tenant. The private image has an operating system and a corresponding driver installed, and may be used as a template and distributed to the tenant.

The Cinder component may export data (including the operating system, the driver, and the like) in the second volume as an image file, place the image file in the OBS bucket for storage, and inherit the metadata from the ISO file stored in the first volume, for example, metadata that describes a name of the image file, a type of the operating system, an installed driver, and an identifier of the private image. It should be noted that, for the metadata inherited from the first volume, the Cinder component may further update the metadata. For example, metadata corresponding to the original ISO file may include metadata with a manner of booting that is "cdrom". However, the operating system in the current ISO file has been installed into the second volume, and the temporary cloud server does not need to boot installation of the operating system from the cdrom again. Therefore, the metadata (that is, the "cdrom") in the ISO file does not need to be retained. Correspondingly, the metadata may be deleted in a process of inheriting the metadata from the first volume. Certainly, during actual application, the metadata adaptively updated by the Cinder component may further include other metadata (for example, the disk interface type corresponding to the ISO file needs to be updated from "ide" to "disk"), which may be determined based on an actual application requirement. Details are not described herein in this embodiment.

It should be noted that, the ISO file may be stored in the OBS bucket, the ISO file may be directly obtained from the OBS bucket in the process of creating a private image, and there is no need to locally store the ISO file in advance on a node supporting the cloud management platform. In this way, occupation of storage space of the node can be reduced. In addition, because the ISO file does not need to be stored locally, a problem that when live migration is performed on the temporary cloud server, live migration cannot be implemented because the temporary cloud server needs to carry the local ISO file can be avoided.

In a further possible implementation, after creating a private image expected by the tenant, the cloud management platform 100 may delete the temporary cloud server generated in the process of creating a private image, to release a resource occupied by the temporary cloud server. Therefore, this embodiment may further include the following operation.

Operation S206: The cloud management platform 100 provides a cloud server deletion interface, where the cloud server deletion interface is configured to receive a fifth operation input by the tenant, and deletes the temporary cloud server based on the fifth operation.

In this way, the resource occupied by the temporary cloud server can be released, to avoid occupation and waste of an unnecessary cloud server resource.

Figure 5:
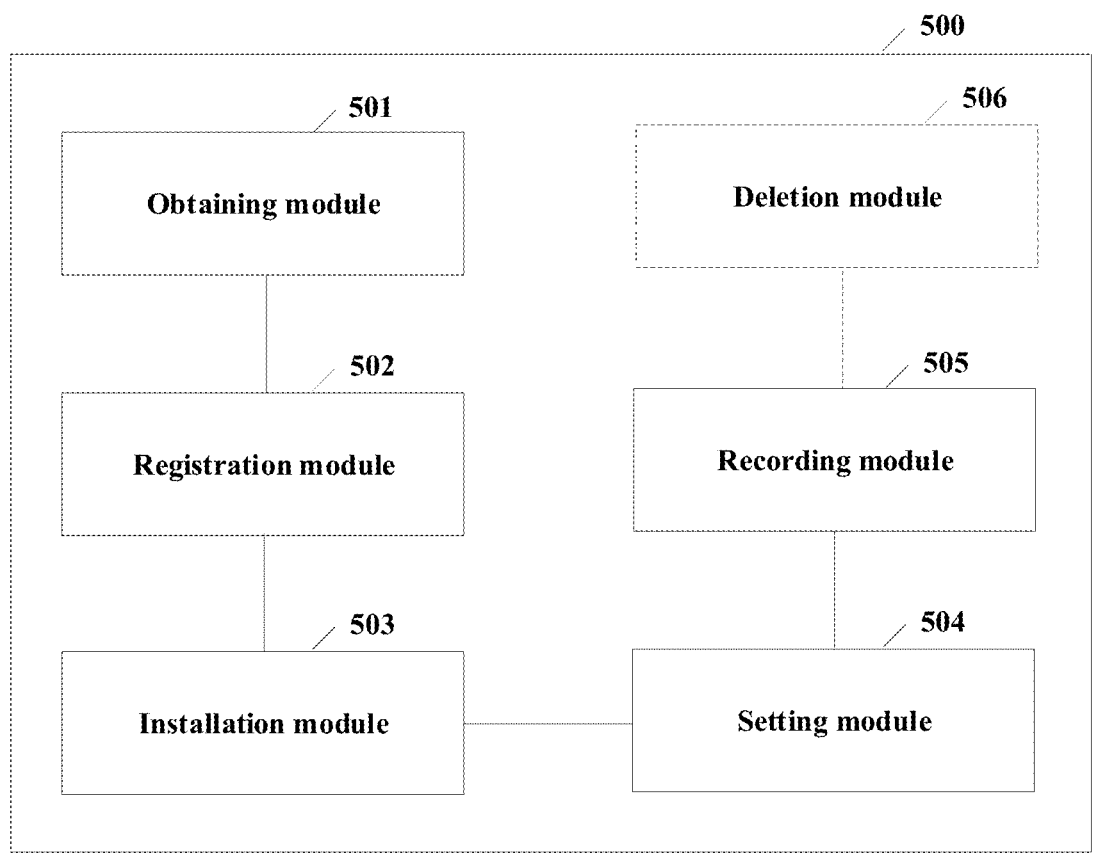
FIG. 5 is a schematic structural diagram of an apparatus for creating a private image in a public cloud according to an embodiment of this application.

Based on the foregoing method used by a cloud management platform to create a private image, an embodiment of this application further provides an apparatus for creating a private image in a public cloud. FIG. 5 is a schematic structural diagram of an apparatus for creating a private image in a public cloud. The apparatus 500 may be used on a cloud management platform on a network side. As shown in FIG. 5, the apparatus 500 may include:

an obtaining module 501, configured to: provide an isolation ISO file uploading interface, and obtain, through the ISO file uploading interface, an ISO file uploaded by a tenant, where the ISO file carries an installation file of an operating system;

a registration module 502, configured to: provide an ISO image registration interface, where the ISO image registration interface is configured to receive a first operation input by the tenant, and register the ISO file as an ISO image in the public cloud based on the first operation, where the ISO image carries the installation file of the operating system and registration information;

an installation module 503, configured to: provide a cloud server installation interface, where the cloud server installation interface is configured to receive a second operation input by the tenant, and install, based on the second operation by using the installation file, the operating system carried in the ISO image on a temporary cloud server;

a setting module 504, configured to: provide a cloud server setting interface, where the cloud server setting interface is configured to receive a third operation input by the tenant, and set a running environment in an operating system on the temporary cloud server based on the third operation; and a recording module 505, configured to: provide a cloud server image obtaining interface, where the cloud server image obtaining interface is configured to receive a fourth operation input by the tenant, obtain, based on the fourth operation, an image of the temporary cloud server in which the running environment is set, and record the image as a system disk image of the tenant in the public cloud, where the system disk image is provided for the tenant to create, in the public cloud, a cloud server in which the operating system and the running environment are set.

In an embodiment, the apparatus 500 further includes:

a deletion module 506, configured to: provide a cloud server deletion interface, where the cloud server deletion interface is configured to receive a fifth operation input by the tenant, and delete the temporary cloud server based on the fifth operation.

In an embodiment, the cloud server installation interface is further configured to receive a sixth operation input by the tenant, and the installation module 503 is configured to install the operating system for the temporary cloud server based on the sixth operation.

In an embodiment, the installation module 503 is configured to:

obtain an automatic answer file in the installation file of the operating system; and install the operating system and a driver on the temporary cloud server based on the automatic answer file.

In an embodiment, the temporary cloud server includes a first volume and a second volume, the first volume includes the operating system and a driver, and the installation module 503 is configured to install the operating system and the driver that are in the first volume into the second volume, where a manner of booting an operating system in the second volume is booting from a hard drive.

In an embodiment, the system disk image is a system disk image that is based on a Windows operating system, and the obtaining module 501 is configured to:

obtain, through the ISO file uploading interface, an original installation file that is uploaded by the tenant and that includes the Windows operating system; and integrate a driver corresponding to the Windows operating system into the original installation file, to obtain the ISO file.

The apparatus 500 for creating a private image in a public cloud provided in this embodiment corresponds to the method for creating a private image in a public cloud in the foregoing embodiment. Therefore, for implementations of the modules provided in this embodiment and technical effects of the modules, refer to related descriptions in the foregoing embodiment. Details are not described herein again.

Figure 6:
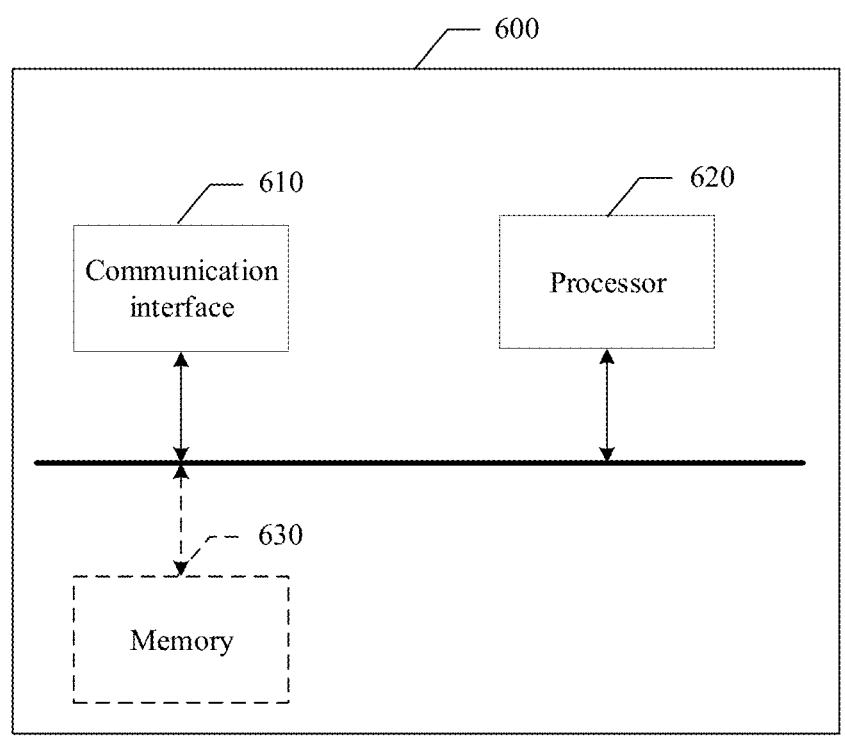
FIG. 6 is a schematic diagram of a hardware structure of a computing device according to an embodiment of this application.

In addition, an embodiment of this application further provides a computing device. The computing device may be a device configured to implement the cloud management platform, or may be a device that is on the cloud management platform and that is configured to implement a function of the cloud management platform in the foregoing embodiments. FIG. 6 is a schematic diagram of a hardware structure of the computing device. As shown in FIG. 6, the computing device 600 may include a communication interface 610 and a processor 620. In an embodiment, the computing device 600 may further include a memory 630. The memory 630 may be disposed inside the computing device 600, or may be disposed outside the computing device 600. For example, all actions performed by the cloud management platform in the foregoing embodiment may be implemented by the processor 620. The processor 620 receives, through the communication interface 610, an operation input by a user, and is configured to implement any method performed by the cloud management platform in FIG. 2. The communication interface may include the ISO file uploading interface, the ISO image registration interface, the cloud server installation interface, the cloud server setting interface, the cloud server image obtaining interface, and the like. In some examples, the communication interface may further include a cloud server deletion interface. In an implementation process, each operation of a processing procedure may implement, by using a hardware integrated logic circuit or instructions in a form of software in the processor 620, the method performed by the cloud management platform in FIG. 1. For brevity, details are not described herein again. Program code executed by the processor 620 to implement the foregoing method may be stored in the memory 630. The memory 630 is connected to the processor 620, for example, a coupled connection.

Some features in this embodiment of this application may be implemented/supported by the processor 620 by executing program instructions or software code in the memory 630. Software components disposed on the memory 630 may be summarized from a function or logic perspective, for example, the obtaining module 501, the registration module 502, the installation module 503, the setting module 504, the recording module 505, and the deletion module 506 shown in FIG. 5.

Any communication interface in this embodiment of this application may be a circuit, a bus, a transceiver, or any other apparatus that may be configured to exchange information, for example, the communication interface 610 in the computing device 600. For example, the another apparatus may be a device connected to the computing device 600, for example, may be a device used when a tenant uploads an ISO file.

In this embodiment of this application, the processor may be a general-purpose processor, a digital signal processor, an application-specific integrated circuit, a field-programmable gate array or another programmable logic device, a discrete gate or transistor logic device, or a discrete hardware component, and may implement or perform the methods, operations, and logical block diagrams disclosed in embodiments of this application. The general-purpose processor may be a microprocessor, any conventional processor, or the like. The operations of the method disclosed with reference to embodiments of this application may be directly performed by a hardware processor, or may be performed by using a combination of hardware in the processor and a software module.

Couplings in embodiments of this application are indirect couplings or communication connections between apparatuses, units, or modules, may be in an electrical, a mechanical, or another form, and are used for information exchange between the apparatuses, the units, and the modules.

The processor may cooperate with the memory. The memory may be a nonvolatile memory, for example, a hard disk drive (HDD) or a solid-state drive (SSD), or may be a volatile memory, for example, a random-access memory (RAM). The memory is any other medium that can carry or store expected program code in a form of an instruction structure or a data structure and that can be accessed by a computer, but is not limited thereto.

A connection medium between the communication interface, the processor, and the memory is not limited in this embodiment of this application. For example, the memory, the processor, and the communication interface may be connected by using a bus. The bus may be classified into an address bus, a data bus, a control bus, and the like.

Based on the foregoing embodiments, an embodiment of this application further provides a computer storage medium. The storage medium stores a software program, and when the software program is read and executed by one or more processors, the method for creating a private image in a public cloud provided in any one or more of the foregoing embodiments may be implemented. The computer storage medium may include any medium that can store program code, such as a USB flash drive, a removable hard disk, a read-only memory, a random-access memory, a magnetic disk, or an optical disc.

Based on the foregoing embodiments, an embodiment of this application further provides a chip. The chip includes a processor, configured to implement a function of the apparatus for creating a private image in a public cloud in the foregoing embodiments, for example, configured to implement the method for creating a private image in a public cloud in FIG. 1. In an embodiment, the chip further includes a memory, and the memory is configured to execute program instructions and data that are necessary for the processor. The chip may include a chip, or may include a chip and another discrete device.

Claims, and accompanying drawings of this application, the terms "first", "second", and the like are intended to distinguish between similar objects but do not necessarily indicate a order or sequence. It should be understood that the terms used in such a way are interchangeable in proper circumstances, which is merely a discrimination manner that is used when objects having a same attribute are described in embodiments of this application.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the apparatus (system), and the computer program product according to embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a function in one or more processes in the flowcharts and/or in one or more blocks in the block diagrams.

These computer program instructions may alternatively be stored in a computer-readable memory that can instruct the computer or another programmable data processing device to work in a manner, so that the instructions stored in the computer-readable memory generate an artifact that includes an instruction apparatus. The instruction apparatus implements a function in one or more processes in the flowcharts and/or in one or more blocks in the block diagrams.

The computer program instructions may alternatively be loaded onto a computer or another programmable data processing device, so that a series of operations are performed on the computer or the another programmable device, so that computer-implemented processing is generated. Therefore, the instructions executed on the computer or the another programmable device provide operations for implementing a function in one or more processes in the flowcharts and/or in one or more blocks in the block diagrams.

It is clear that a person skilled in the art can make various modifications and variations to embodiments of this application without departing from the scope of embodiments of this application. In this way, this application is intended to cover these modifications and variations of embodiments of this application provided that they fall within the scope of protection defined by the following claims and their equivalent technologies.

What is claimed is:

1. A method for creating a private image in a public cloud, wherein the method is used for a cloud management platform on a network side, and the method comprises:

providing an isolation (ISO) file uploading interface, and obtaining, through the ISO file uploading interface, an ISO file uploaded by a tenant, wherein the ISO file carries an installation file of an operating system;

providing an ISO image registration interface, wherein the ISO image registration interface is configured to receive a first operation input by the tenant, and registering the ISO file as an ISO image in the public cloud based on the first operation, wherein the ISO image carries the installation file of the operating system and registration information;

providing a cloud server installation interface, wherein the cloud server installation interface is configured to receive a second operation input by the tenant, and installing, based on the second operation by using the installation file, the operating system carried in the ISO image on a temporary cloud server;

providing a cloud server setting interface, wherein the cloud server setting interface is configured to receive a third operation input by the tenant, and setting a running environment in an operating system on the temporary cloud server based on the third operation; and providing a cloud server image obtaining interface, wherein the cloud server image obtaining interface is configured to receive a fourth operation input by the tenant, obtaining, based on the fourth operation, an image of the temporary cloud server in which the running environment is set, and recording the image as a system disk image of the tenant in the public cloud, wherein the system disk image is provided for the tenant to create, in the public cloud, a cloud server in which the operating system and the running environment are set.

2. The method according to claim 1, comprising:
providing a cloud server deletion interface, wherein the cloud server deletion interface is configured to receive a fifth operation input by the tenant, and deleting the temporary cloud server based on the fifth operation.

3. The method according to claim 1, the installing the installation file of the operating system carried in the ISO image on a temporary cloud server comprises:
installing the operating system and a driver on the temporary cloud server based on a sixth operation, wherein the cloud server installation interface is further configured to receive the sixth operation input by the tenant.

4. The method according to claim 1, wherein the installing the installation file of the operating system carried in the ISO image on a temporary cloud server comprises:
obtaining an automatic answer file in the installation file of the operating system; and
installing the operating system and a driver on the temporary cloud server based on the automatic answer file.

5. The method according to claim 3, wherein the installing the operating system and a driver on the temporary cloud server comprises:
installing the operating system and the driver that are in a first volume into a second volume, wherein a manner of booting an operating system in the second volume is booting from a hard drive, wherein the temporary cloud server comprises the first volume and the second volume, the first volume comprises the operating system and the driver.

6. The method according to claim 1, wherein the obtaining, through the ISO file uploading interface, an ISO file uploaded by a tenant comprises:
obtaining, through the ISO file uploading interface, an original installation file that is uploaded by the tenant and that comprises a Windows operating system, wherein the system disk image is a system disk image that is based on the Windows operating system; and
integrating a driver corresponding to the Windows operating system into the original installation file, to obtain the ISO file.

7. A computing device, comprising a memory and a processor, wherein the memory is configured to store instructions, and the processor is configured to invoke the instructions in the memory to:
provide an isolation (ISO) file uploading interface, and obtaining, through the ISO file uploading interface, an ISO file uploaded by a tenant, wherein the ISO file carries an installation file of an operating system;
provide an ISO image registration interface, wherein the ISO image registration interface is configured to receive a first operation input by the tenant, and registering the ISO file as an ISO image in a public cloud based on the first operation, wherein the ISO image carries the installation file of the operating system and registration information;
provide a cloud server installation interface, wherein the cloud server installation interface is configured to receive a second operation input by the tenant, and installing, based on the second operation by using the installation file, the operating system carried in the ISO image on a temporary cloud server;
provide a cloud server setting interface, wherein the cloud server setting interface is configured to receive a third operation input by the tenant, and setting a running environment in an operating system on the temporary cloud server based on the third operation; and
provide a cloud server image obtaining interface, wherein the cloud server image obtaining interface is configured to receive a fourth operation input by the tenant, obtaining, based on the fourth operation, an image of the temporary cloud server in which the running environment is set, and recording the image as a system disk image of the tenant in the public cloud, wherein the system disk image is provided for the tenant to create, in the public cloud, a cloud server in which the operating system and the running environment are set.

8. The computing device according to claim 7, wherein the processor is configured to invoke the instructions in the memory to:
provide a cloud server deletion interface, wherein the cloud server deletion interface is configured to receive a fifth operation input by the tenant, and deleting the temporary cloud server based on the fifth operation.

9. The computing device according to claim 7, wherein the cloud server installation interface is further configured to receive a sixth operation input by the tenant, and the installing the installation file of the operating system carried in the ISO image on a temporary cloud server, the processor is configured to invoke the instructions in the memory to:
install the operating system and a driver on the temporary cloud server based on the sixth operation.

10. The computing device according to claim 7, wherein the installing the installation file of the operating system carried in the ISO image on a temporary cloud server, the processor is configured to invoke the instructions in the memory to:
obtain an automatic answer file in the installation file of the operating system; and
install the operating system and a driver on the temporary cloud server based on the automatic answer file.

11. The computing device according to claim 9, wherein the temporary cloud server comprises a first volume and a second volume, the first volume comprises the operating system and the driver, and the installing the operating system and a driver on the temporary cloud server, the processor is configured to invoke the instructions in the memory to:
install the operating system and the driver that are in the first volume into the second volume, wherein a manner of booting an operating system in the second volume is booting from a hard drive.

12. The computing device according to claim 7, wherein the system disk image is a system disk image that is based on a Windows operating system, and the obtaining, through the ISO file uploading interface, an ISO file uploaded by a tenant, the processor is configured to invoke the instructions in the memory to:
obtain, through the ISO file uploading interface, an original installation file that is uploaded by the tenant and that comprises the Windows operating system; and
integrate a driver corresponding to the Windows operating system into the original installation file, to obtain the ISO file.

13. A non-transitory machine-readable medium having instructions stored therein, which when executed by one or more processors, cause the one or more processors to perform operations, the operations comprising:
providing an isolation (ISO) file uploading interface, and obtaining, through the ISO file uploading interface, an ISO file uploaded by a tenant, wherein the ISO file carries an installation file of an operating system;
providing an ISO image registration interface, wherein the ISO image registration interface is configured to receive a first operation input by the tenant, and registering the ISO file as an ISO image in a public cloud based on the first operation, wherein the ISO image carries the installation file of the operating system and registration information;
providing a cloud server installation interface, wherein the cloud server installation interface is configured to receive a second operation input by the tenant, and installing, based on the second operation by using the installation file, the operating system carried in the ISO image on a temporary cloud server;
providing a cloud server setting interface, wherein the cloud server setting interface is configured to receive a third operation input by the tenant, and setting a running environment in an operating system on the temporary cloud server based on the third operation; and
providing a cloud server image obtaining interface, wherein the cloud server image obtaining interface is configured to receive a fourth operation input by the tenant, obtaining, based on the fourth operation, an image of the temporary cloud server in which the running environment is set, and recording the image as a system disk image of the tenant in the public cloud, wherein the system disk image is provided for the tenant to create, in the public cloud, a cloud server in which the operating system and the running environment are set.

14. The machine-readable medium according to claim 13, wherein the operations further comprise:
providing a cloud server deletion interface, wherein the cloud server deletion interface is configured to receive a fifth operation input by the tenant, and deleting the temporary cloud server based on the fifth operation.

15. The machine-readable medium according to claim 13, wherein the installing the installation file of the operating system carried in the ISO image on a temporary cloud server comprises:
installing the operating system and a driver on the temporary cloud server based on a sixth operation, wherein the cloud server installation interface is further configured to receive the sixth operation input by the tenant.

16. The machine-readable medium according to claim 13, wherein the installing the installation file of the operating system carried in the ISO image on a temporary cloud server comprises:
obtaining an automatic answer file in the installation file of the operating system; and
installing the operating system and a driver on the temporary cloud server based on the automatic answer file.

17. The machine-readable medium according to claim 15, wherein the installing the operating system and a driver on the temporary cloud server comprises:
installing the operating system and the driver that are in a first volume into a second volume, wherein a manner of booting an operating system in the second volume is booting from a hard drive, wherein the temporary cloud server comprises the first volume and the second volume, the first volume comprises the operating system and the driver.

18. The machine-readable medium according to claim 13, wherein the obtaining, through the ISO file uploading interface, an ISO file uploaded by a tenant comprises:
obtaining, through the ISO file uploading interface, an original installation file that is uploaded by the tenant and that comprises a Windows operating system, wherein the system disk image is a system disk image that is based on the Windows operating system; and
integrating a driver corresponding to the Windows operating system into the original installation file, to obtain the ISO file.

* * * * *